United States Patent [19]
Lewis

[11] Patent Number: 5,615,711
[45] Date of Patent: Apr. 1, 1997

US005615711A

[54] SCREEN ENCASED EXHAUST HOSE

[76] Inventor: Harvey S. Lewis, 646 W. Orange Ave., St. Paul, Minn.

[21] Appl. No.: 500,634

[22] Filed: Jul. 11, 1995

[51] Int. Cl.$^6$ .................................................. F16L 9/14
[52] U.S. Cl. ........................ 138/149; 138/110; 138/131; 138/152
[58] Field of Search ................................ 138/149, 110, 138/119, 124, 131, 152

[56] References Cited

U.S. PATENT DOCUMENTS

| | | | |
|---|---|---|---|
| 2,264,967 | 12/1941 | Cryor | 138/124 |
| 3,023,787 | 3/1962 | Phillips et al. | 138/131 |
| 3,559,694 | 2/1971 | Volberg | 138/149 |
| 3,948,295 | 4/1976 | Lemont et al. | 138/149 |
| 4,846,147 | 7/1989 | Townsend et al. | 138/149 |
| 5,031,665 | 7/1991 | Chen et al. | 138/149 |
| 5,092,122 | 3/1992 | Bainbridge | 138/149 |
| 5,303,744 | 4/1994 | Eriksson | 138/110 |

*Primary Examiner*—David Scherbel
*Assistant Examiner*—James F. Hook
*Attorney, Agent, or Firm*—Kinney & Lange, P.A.

[57] ABSTRACT

An exhaust hose for an internal combustion engine is encase in a screen sleeve. The hose has a metal tube on the inside which can withstand the temperatures of the internal combustion exhaust fumes. The metal tube has ribs which enable it to be bent without kinking, but also provides significant strength to the hose. A thermal insulation layer is placed around the metal tube. The thermal insulation layer may include a gauze wrapping, allowing the inner portion of the thermal insulation layer to breath. The screen sleeve provides an outer layer for the exhaust hose. Preferably the screen sleeve is slightly larger in diameter than the thermally insulated metal tube, such that the screen sleeve fits loosely.

21 Claims, 3 Drawing Sheets

SCREEN ENCASED EXHAUST HOSE

BACKGROUND OF THE INVENTION

This invention relates to exhaust hoses, and more particularly, to bendable exhaust hoses to carry exhaust fumes from an internal combustion engine.

Internal combustion engines such as diesel engines and the like are often used in locations with inadequate ventilation. One particular example of this is for a diesel engine used to power a water pump on a ship. Such an pump may be used to fight a fire on the ship, or to remove water from the hull of the ship and pump it overboard. It is sometimes necessary to use such an engine in confined quarters, such as below deck on the ship. These engines may be portable, allowing the engine (and pump) to be carried or moved to the location of best advantage. In emergency conditions such as fire fighting or taking on water, speedy relocation of the engine may be necessary.

Exhaust fumes emitted from the engine in a poorly ventilated location may create unacceptable levels of emission gasses or particles in the air. Exhaust fumes may be emitted from the engine at temperatures in excess of 900° F., and use of the engine may cause undesired build-up of heat and toxic fumes within the confined quarters. As it may be necessary to run the engine for a lengthy period of time (such as 48 hours or more), emission and heat problems are further aggravated. To avoid or minimize these problems, exhaust fumes are piped or otherwise transmitted away from the engine to a location where they will not cause damage either due to the temperature of the exhaust or the composition of the exhaust fumes.

Various attributes or design criteria are required for an exhaust hose to function effectively in the applications in which it may be used. For example, exhaust hoses which are flexible or bendable are desired, allowing the exhaust hose to be placed as required for any location. Exhaust hoses should be readily assembled and disassembled, to facilitate speedy relocation of the engine. Exhaust hoses should be strong and resilient, so as to not compress or kink if stepped on or otherwise subjected to compression forces. The environment of the hose can be subject to salt water corrosion, and the hose should be corrosion resistant. Also, the hose may be subject to considerable vibration due to the vibration of the diesel motor and pump. The hose must be able to withstand this vibration without any physical deterioration. Finally, and perhaps most importantly for emergency conditions, it may be necessary to readily assemble, disassemble and handle the hose either with gloves or by hand. Outer surfaces of exhaust hoses should avoid excessive heat or temperature buildup from the engine exhaust. The exhaust hose should be able to withstand the exhaust gas temperature for a significantly lengthy operation of the engine such as 48 hours longer. The external temperature of the hose should not exceed 400° F. (at 8 inches from the engine) during this engine operation. The extended length of the hose should have a relative cool external temperature, such as less than 160° F. at 10 feet or further from the engine. Hose connections need to be constructed so that they do not leak in the handling of the hot exhaust gasses, and such that all of the engine exhaust gasses are captured.

Prior art exhaust hoses for such applications have included water cooled jackets. While these water cooled systems can be flexible and can cool the exhaust hose sufficiently to enable it to be manipulated by hand or with gloves, the difficulties associated with prior water-cooled hoses are many. The water used in cooling the hose adds significant weight to the hose, makes the hose stiffer, and in general makes the exhaust hose difficult to work with, particularly in an emergency situation. Water cooled exhaust hoses are subject to leakage and other similar problems which causes the exhaust hoses to be unreliable. The water cooling system generally requires its own pumping system and cooling system for the coolant water to prevent steam buildup within the water jacket, adding further possibilities for failure. Accordingly, it is desired to have a new design of exhaust hose which will avoid the problems of the prior art, while still functioning effectively and reliably.

SUMMARY OF THE INVENTION

The present invention is a screen encased exhaust hose and a method of manufacturing the same. The hose has a metal tube on the inside which can withstand the temperatures of the internal combustion exhaust fumes. The metal tube is bendable without kinking, but also provides significant strength to the hose. A thermal insulation layer is placed around the metal tube. The thermally insulated metal tube is then encased in a screen sleeve. The design of the present invention provides numerous benefits not present in the prior art.

While the above-identified drawing figures set forth one alternative embodiment, other embodiments of the present invention are also contemplated, some of which are noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
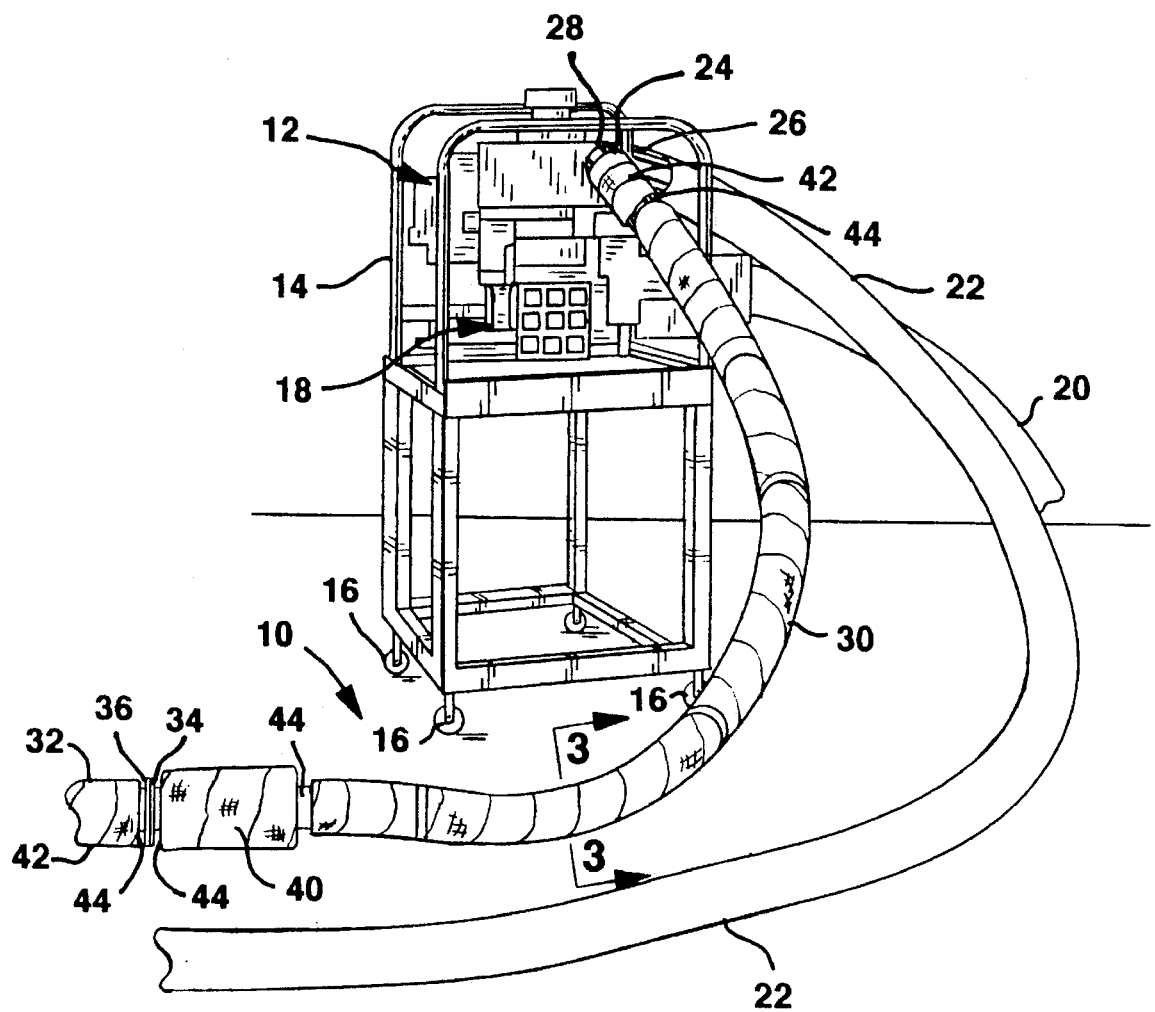
FIG. 1 is a perspective view showing the exhaust hose of the present invention attached to a diesel engine and pump.

FIG. 1 shows exhaust hose 10 attached to engine 12. Engine 12 is mounted on stand 14, which may have casters 16 to aid in portability. Engine 12 drives pump 18, shown with inlet water hose 20 and output water hose 22. Each of hoses 10, 20 and 22 may have adapters or coupling devices 24, 26 to allow hoses 10, 20 and 22 to readily connect and disconnect to engine 12. Exhaust hose 10 is attached to exhaust manifold or pipe 28 of engine 12 to receive exhaust fumes from engine 12. The design of coupling device 24 should be suitable to provide a seal against exhaust pipe 28 while withstanding the exhaust heat of engine 12.

Exhaust hose 10 may be made in a number of sections 30, 32. When made in a number of sections 30, 32, exhaust hose 10 may include mating connectors or coupling devices 34, 36 at each end. Coupling devices 34, 36 may include a ¼ inch thick stainless steel plate machined to accept a quick clamp on the connecting side. Coupling devices 34, 36 enable ready attachment and detachment of the sections 30, 32 to create a single exhaust hose 10.

Coupling devices 34, 36 may further attach to and cap hose section 30 on the non-connecting side. Providing a secure capping arrangement for the ends of sections 30, 32 helps prevent unravelling or other physical deterioration due to vibration of engine 12. Ends 40, 42 of hose sections 30, 32 may include a section of double screen thickness, which is secured by metal band 44. Metal band 44 is preferably a ⅝ inch stainless steel band which caps ends 40, 42 at the ends of sections 30, 32 and at about 11 inches from the ends of sections 30, 32.

The preferred length for each section 30, 32 is about 10 feet. This length allows sections 30, 32 to be easily stored and transported, while not requiring excessive assembly time to form exhaust hose 10.

Figure 2:
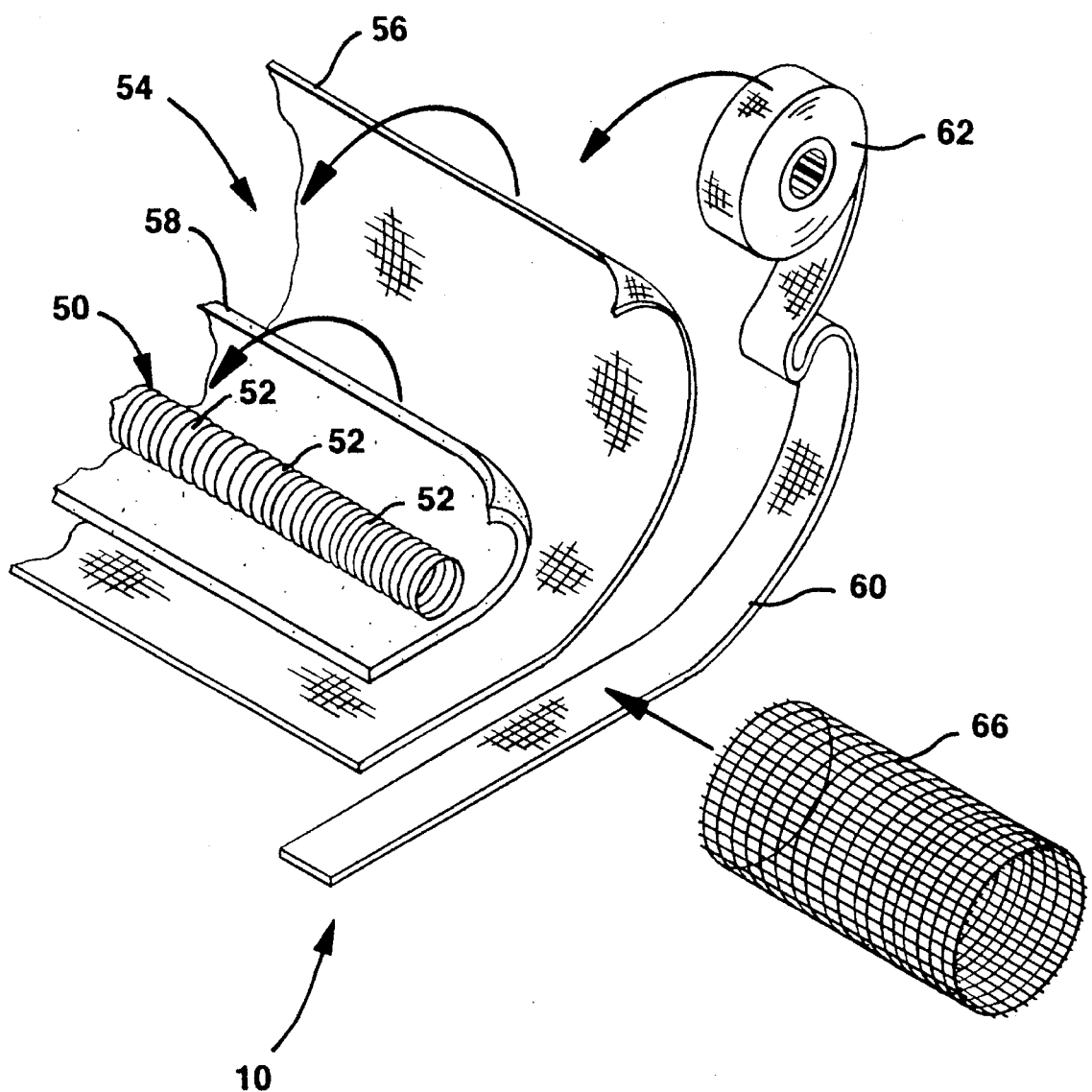
FIG. 2 is an exploded perspective view illustrating construction of the exhaust hose of the present invention.
Figure 3:
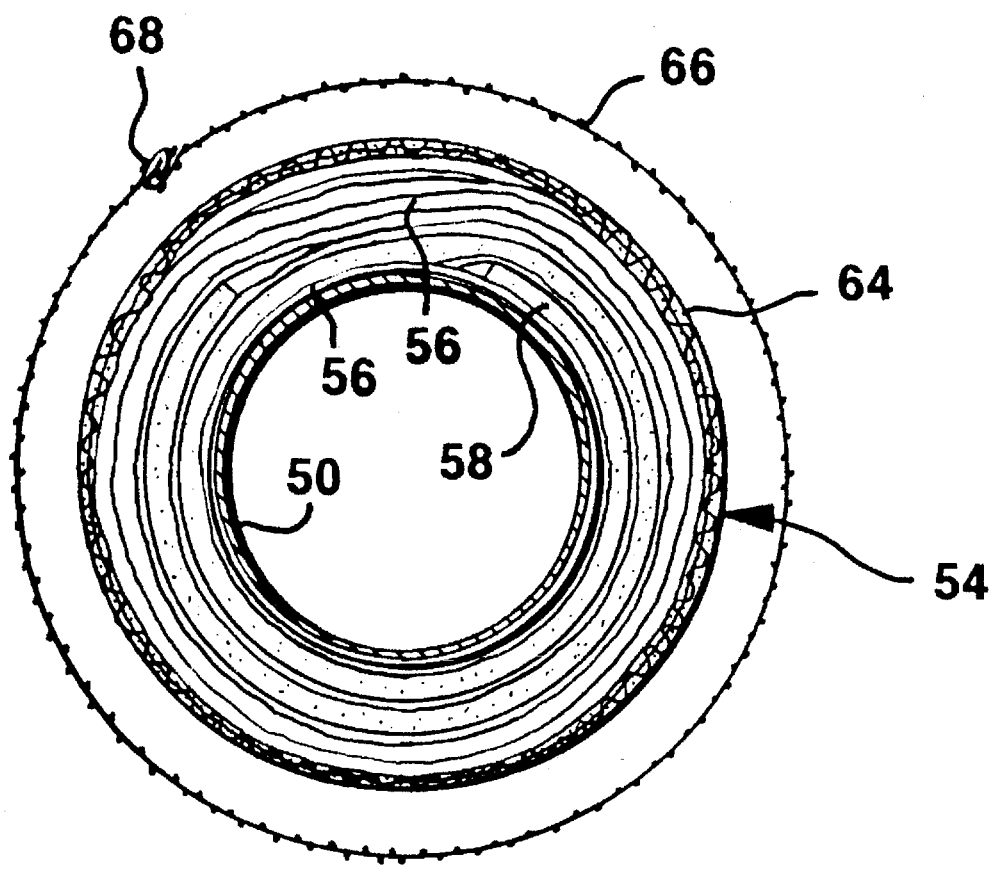
FIG. 3 is a cross-sectional view of the exhaust hose of the present invention, taken along lines 3—3 from FIG. 1.

FIGS. 2 and 3 depict the construction of exhaust hose 10. Inner metal tube 50 provides the central exhaust channel for the hose. Inner tube 50 is preferably of two-inch inside diameter flexible stainless steel piping. Metal tube 50 should be able to withstand the exhaust heat from the engine, which will generally be 500° F. or more. Preferably metal tube 50 will withstand temperatures in excess of 900° F. without detriment. For instance, the piping used may have a wall thickness of 0.065 inches and be configured in a helically ribbed arrangement with a triple mechanical lock between helical windings of stainless steel. These ribs 52 are preferably approximately 3/16 inches deep. Ribs 52 allow metal tube 50 to bend or flex without kinking and without permanent deformation or damage to metal tube 50. Ribs 52 also add strength to metal tube 50 to withstand a radial compressive force, such as when exhaust hose 10 is stepped on. Such piping for metal tube 50 is available in 10-foot lengths from Uniflex Industries of Mount Laurel, N.J.

Metal tube 50 is surrounded by thermal insulation 54. As shown in FIG. 3, thermal insulation 54 provides a layer of about ½ to ¾ inches around metal tube 50. As shown in FIG. 2, thermal insulation 54 preferably includes three separate components 56, 58 and 60. The first component 56 is a wrapping of fiberglass cloth. Fiberglass cloth 56 has a thickness of 0.03 inches and a weight of 18 ounces per square yard. Suitable fiberglass cloth, for instance, is available from Auburn Manufacturing, Inc. of Mechanic Falls, Me. under the trade name AMIGLASS. In constructing hose 10, fiberglass cloth 56 may be cut to sheets of 60 inches by 10 feet in length, allowing numerous windings of fiberglass cloth 56 about metal tube 50.

A second component in thermal insulation 54 is refractor blanket 58 which may be formed of alumina, silica and other refractory oxides. A suitable refractor blanket 58 is available in ¼ inch thicknesses from Carborundum Co. of Niagara Falls, N.Y. under the trade name FIBERFRAX 550K PAPER. In constructing hose 10, refractor blanket 58 may be cut to sheets of 12 inches by 9 to 10 feet in length. This 12 inch width provides slightly less than two windings of refractor blanket 58 about metal tube 50.

In assembling thermal insulation 54 about metal tube 50, refractor blanket 58 may be simply placed on top of fiberglass cloth 56, several inches from the edge of fiberglass cloth 56. The combination of refractor blanket 58 and fiberglass cloth 56 may then simply be rolled around metal tube 50. Preferably one complete winding or turn of fiberglass cloth 56 is provided between metal tube 50 and refractor blanket 58. Fiberglass cloth 56 provides a separation between layers of refractor blanket 58, and completely covers the outside of refractor blanket 58 with several windings.

A third component 64 may be also used around fiberglass cloth 56 and refractor blanket 58. The preferred wrapping 64 is a fiberglass mesh or gauze 60. Gauze 60 may have an adhesive coating to adhere it to the fiberglass cloth and to itself. Gauze 60 preferably comes in a roll 62 of about 2½ inches wide. Gauze 60 may be wound helically around the thermal insulation 54 using approximately 1¼ inch longitudinal advance per winding of gauze 60, thus creating a gauze layer 64 which includes approximately two windings of gauze 60. Suitable adhesive gauze is available from United States Gypsum Company of Chicago, Ill.

Gauze layer 64 is continuous around hose 10 and provides strength and form to the inner wrappings of thermal insulation 54. Gauze layer 64 prevents fiberglass cloth 56 and refractor blanket 58 from unrolling and unravelling, and no further attachment means is required to attach thermal insulation 54 to metal tube 50. The gauze-wrapped hose 10 preferably has an outside diameter of approximately 3¾ inches.

The outer covering hose of exhaust hose 10 is a continuous tube or sleeve 66 of screen cloth. Screen sleeve 66 will perform better for most applications if it has a wire thickness of less than 0.05 inches. Preferably, the screen mesh includes 20 strands per inch of 0.009 inch diameter wire. Suitable screen cloth is available from Southwest Wire Cloth Company of Tulsa, Okla. Screen sleeve 66 may be made from approximately a 16 inch by 10 foot length sheet of screen. At the ends of the sheet, the screen tube may include a section of double thickness over approximately 12 inches. The screen sheet may be rolled into a 10 foot long tube, with two approximately ½ inch widths of screen used for a longitudinal hem 68. Hem or seam 68 runs continuously along the length of the hose. Longitudinal hem 68 is spot-welded together to provide a tubular sleeve 66.

The sections of double thickness at ends 40, 42 facilitate attachment of screen sleeve 66 to the other components of the hose and to coupling mechanisms 24, 34. Insulation layer 54 may also have sections of double thickness at ends 40, 42. Providing additional insulation at ends 40, 42 may be beneficial as ends 40, 42 are likely to be handled during coupling and decoupling of hose sections 30, 32.

Screen sleeve 66 is preferably 0.25 inches or more larger than the gauze-wrapped hose. A screen sleeve 66 of approximately 4½ inches in diameter (about ¾ of an inch larger than the gauze-wrapped hose) has been found to work suitably. This size difference allows for some movement and space between screen sleeve 66 and the gauze-wrapped hose, while still providing a loose fit between screen sleeve 66 and the gauze-wrapped hose which is not sloppy.

The gauze wrapped hose 10 is then longitudinally inserted in the screen sleeve 66. Gauze layer 64 also helps provide a smoother, fiber free surface as compared to the fiberglass cloth and refractor blanket which allows screen sleeve 66 to be placed over thermal insulation 54 without catching.

As shown in FIG. 1, metal band 44 is attached at the coupling and at approximately 11 inches from the end of hose 10 to hold the second layer of screen 66 and to further add structural support to the entire configuration. Coupling devices 34, 36 may be welded or otherwise attached to the ends of metal tube 50 and screen sleeve 66. A preferred attachment for coupling devices 34, 36 includes a length of slightly smaller diameter metal tubing projecting into the end of metal tube 50 and attached to metal tube 50 with a U-clamp.

Exhaust hose 10 constructed as described avoids the various problems associated with the prior art water-cooled jacket hose. However, exhaust hose 10 also provides significant thermal dissipation benefits. It is believed that several factors contribute to the beneficial thermal dissipation effects of the present invention.

Screen sleeve 66 (and gauze layer 64 if present) allow passing of both radiant and convection heat. The mesh-like nature of these layers permits significant air flow to the outer layers of thermal insulation 54. While thermal insulation 54 tends to prevent the flow of heat outward and encourages longitudinal heat flow, gauze layer 64 and screen sleeve 66 allow significant cooling of the outer surface of thermal insulation 54. Air flow inside screen sleeve 66 and gauze layer 64 allows heat dissipation to occur from locations within the interior of exhaust hose 10, rather than only from the exterior surface. This allows the exterior surface to be at a lower temperature than would otherwise be possible.

Screen sleeve 66 is made of metal and thus conducts heat quickly. Conversely, screen sleeve 66 is quite fine, and has a very small thermal mass at any given location. Accordingly, when contacted by a worker's hand or glove, a small amount of heat will be initially transferred to the hand/glove, and the mass of the screen contacting the worker's hand/glove will quickly cool to a temperature near the hand/glove temperature. Thus, the small thermal mass of screen sleeve 66 helps to prevent burns during short moments of contact.

The difference between the inside diameter of screen sleeve 66 and the outside diameter of thermal insulation 54 also has a beneficial effect. In addition to enabling the thermally insulated hose 10 to be inserted into the screen sleeve 66 without excessive difficulty, the spacing also allows screen sleeve to avoid direct contact in many locations with thermal insulation 54. In effect, an air convection layer is used to cool thermal insulation 54 and to insulate screen sleeve 66 from thermal insulation 54. Because of these effects, screen sleeve 66 in many instances will be significantly cooler than the outside of thermal insulation 64.

Screen sleeve 66 also helps to prevent burns during prolonged contact or grasping of exhaust hose 10. After initial contact by a worker's hand/glove, heat will conduct along screen sleeve 66 until the worker's hand/glove temperature heats to a temperature near the screen temperature. However, screen sleeve 66 will prevent contact with the warmer interior of thermal insulation 54. If the screen sleeve 66 is compressed by the worker's grasp such that the air flow and insulation described above no longer occurs at that location, conduction of heat along the screen will actually help prevent further buildup of heat against the worker's hand/glove. That is, because other locations of the screen will continue to be air cooled and air insulated, heat from thermal insulation 54 will be conducted by screen sleeve 66 away from the area of the worker's grasp. Even when screen sleeve 66 is pressed against thermal insulation 54 to move exhaust hose 10, screen sleeve 66 tends to conduct heat away from the worker's hand/glove to other portions of screen sleeve 66 which are not in direct contact with thermal insulation 54.

Exhaust hose 10 also fulfills design criteria not related to heat dissipation. Both thermal insulation 54 and screen sleeve 66 add strength to hose 10. Refractor blanket 58 is made from a resilient material, such that it will rebound after compression by a significant three. Screen sleeve 66, gauze layer 64 and fiberglass cloth 56 all flex under weight and tend to spread out compressive forces, but do not undergo permanent deformation. Because of these features, hose 10 will not kink or close up when a 200 pound force is concentrated on no more than four inches of the hose length (such as when stepped on by a worker). Hose 10 will also avoid any permanent deformation after the compressive force is removed, such that the beneficial thermal effects of the hose continue as designed.

Exhaust hose 10 is bendable and not stiff, which allows exhaust hose 10 to be stored in a coiled or curved position. The bendability of exhaust hose 10 further allows placement to avoid whatever obstacles are present in the location required by use of engine 12. The outside diameter of the hose is about 4½ inches, which makes it appropriately sized for a worker's hand to grasp and to work with. All of the hose components are relatively lightweight, again making hose 10 easily moved and handled by a worker.

The materials used for exhaust hose 10 are corrosion resistant. Submersion of the hose 10 in salt or fresh water, which might be necessary in certain emergency situations, will not cause any permanent corrosion or damage. Screen sleeve 66 in particular provides an outside coating to hose 10 which is wear resistant and avoids getting snagged or caught on sharp objects. All of these feature contribute to an exhaust hose 10 which performs better than previous exhaust hoses.

Although the present invention has been described with reference to preferred embodiments, workers skilled in the art will recognize that changes may be made in form and detail without departing from the spirit and scope of the invention. For instance, numerous types of coupling arrangements can be used to connect the ends of the hose and disconnect the ends of the hose as desired. Different types of inner tubing, refractor blankets and insulation layers can be used, provided that they can withstand the temperature of the exhaust hose and act to thermally insulate the inside of the exhaust hose. Additional layers may be added, either inside the inner tubing or in the thermal insulation. Other types of manufacturing steps could be used equally well, such as methods of encasing or wrapping the metal tube in thermal insulation other than winding. Conversely, the screen layer could be wrapped around the thermally insulated hose prior to forming the screen sleeve. While the exhaust hose is shown as used with a diesel engine and water pump, the exhaust hose may be equally applicable in other environments and with other types of engines. Numerous further changes can be made in form and detail by workers skilled in the art while still using the invention as defined in the following claims.

What is claimed is:

1. A bendable exhaust hose for transmitting exhaust fumes from an internal combustion engine, comprising:

a metal tube, the metal tube being bendable, the metal tube being able to withstand temperatures in excess of 500° F.;

a thermal insulation layer around the metal tube; and a screen mesh sleeve around the insulation layer, wherein the screen mesh sleeve is made of metal, is flexible and allows air flow radially therethrough to the thermal insulation layer, and wherein the screen mesh sleeve provides an outermost surface of the bendable exhaust hose for handling of the bendable exhaust hose.

2. The bendable exhaust hose of claim 1, wherein the metal tube is ribbed to allow the metal tube to be bent without kinking.

3. The bendable exhaust hose of claim 1, wherein the metal tube is of stainless steel.

4. The bendable exhaust hose of claim 1, wherein the thermal insulation layer comprises:

a refractor blanket of a refractory oxide wrapped around the metal tube.

5. The bendable exhaust hose of claim 1, wherein the thermal insulation layer comprises:

a fiberglass cloth wrapped around the metal tube.

6. The bendable exhaust hose of claim 5, wherein the thermal insulation layer further comprises a refractor blanket of a refractory oxide.

7. The bendable exhaust hose of claim 6, wherein the fiberglass cloth separates the refractor blanket from the metal tube, provides a separation between layers of refractor blanket, and covers the outside of refractor blanket.

8. The bendable exhaust hose of claim 1, wherein the thermal insulation layer comprises:

inner insulation; and gauze wrapped around the inner insulation.

9. The bendable exhaust hose of claim 8, wherein gauze is of fiberglass.

10. The bendable exhaust hose of claim 9, wherein gauze is adhesive coated.

11. The bendable exhaust hose of claim 1, wherein the screen mesh sleeve is of stainless steel.

12. The bendable exhaust hose of claim 1, wherein the screen mesh sleeve has a thickness of less than 0.05 inches.

13. The bendable exhaust hose of claim 1, wherein the screen mesh sleeve has at least 8 strands per inch.

14. The bendable exhaust hose of claim 1, wherein the thermal insulation layer separates the screen mesh sleeve from direct contact with the metal tube.

15. The bendable exhaust hose of claim 1, wherein the screen mesh sleeve loosely encircles the thermal insulation layer.

16. The bendable exhaust hose of claim 2, wherein the bendable exhaust hose consists essentially of the ribbed metal tube, the thermal insulation layer and the screen mesh sleeve.

17. A bendable exhaust hose for transmitting exhaust fumes from an internal combustion engine, comprising:

a metal tube, the metal tube being bendable, the metal tube being able to withstand temperatures in excess of 500° F.;

a thermal insulation layer around the metal tube having an outer diameter; and a flexible screen mesh sleeve immediately around the insulation layer, the flexible screen mesh sleeve having an inner diameter which is at least 0.25 inches larger than the outer diameter of the thermal insulation layer, such that the flexible screen mesh sleeve fits loosely on the thermal insulation layer, the flexible screen mesh sleeve providing an outermost surface of the bendable exhaust hose to allow air flow radially through the flexible screen mesh sleeve to the thermal insulation layer.

18. A method of manufacturing a bendable exhaust hose for transmitting exhaust fumes from an internal combustion engine, the method comprising:

providing a metal tube which is bendable and able to withstand temperatures in excess of 500° F.;

wrapping a thermal insulation layer around the metal tube to form a thermally insulated metal tube having an outer diameter;

forming a screen mesh sleeve out of a metal screen mesh, the screen mesh sleeve being flexible and allowing air flow radially therethrough, the screen mesh sleeve having an inner diameter which is larger than the outer diameter of the thermal insulated metal tube; and inserting the thermally insulated metal tube longitudinally into the screen mesh sleeve, such that the screen mesh sleeve fits loosely on the thermal insulation layer.

19. The method of claim 18 wherein the wrapping step comprises:

winding a blanket layer around the metal tube.

20. The method of claim 18, wherein the wrapping step comprises:

helically winding gauze around the blanket layer.

21. The method of claim 18, wherein the metal tube is provided in lengths having ends, further comprising:

coupling lengths of tube together.

* * * * *

UNITED STATES PATENT AND TRADEMARK OFFICE
CERTIFICATE OF CORRECTION

PATENT NO. : 5,615,711
DATED : APRIL 1, 1997
INVENTOR(S) : HARVEY S. LEWIS

It is certified that error appears in the above-indentified patent and that said Letters Patent is hereby corrected as shown below:

Col. 5, line 59, delete "three", insert --force--

Signed and Sealed this

Twenty-second Day of July, 1997

Attest:

Attesting Officer

BRUCE LEHMAN

Commissioner of Patents and Trademarks